United States Patent
Burton et al.

(10) Patent No.: US 6,526,419 B1
(45) Date of Patent: Feb. 25, 2003

(54) METHOD, SYSTEM, AND PROGRAM FOR REMOTE COPY IN AN OPEN SYSTEMS ENVIRONMENT

(75) Inventors: David Alan Burton, Vail, AZ (US); Robert Louis Morton, Tucson, AZ (US); Erez Webman, Petach-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 09/591,016

(22) Filed: Jun. 9, 2000

(51) Int. Cl.$^7$ .............................................. G06F 17/30
(52) U.S. Cl. ........................ 707/204; 707/202; 707/203
(58) Field of Search ................................ 707/202, 203, 707/204

(56) References Cited

U.S. PATENT DOCUMENTS

| | | | |
|---|---|---|---|
| 5,537,533 A | 7/1996 | Staheli et al. .................. 714/5 |
| 5,544,347 A | 8/1996 | Yanai et al. ................. 711/162 |
| 5,574,950 A | 11/1996 | Hathorn et al. ................. 710/8 |
| 5,627,961 A | 5/1997 | Sharman ........................ 714/6 |
| 5,649,196 A | 7/1997 | Woodhill et al. ........... 707/204 |
| 5,673,382 A | * 9/1997 | Cannon et al. ................ 714/6 |
| 5,680,580 A | 10/1997 | Beardsley et al. ............ 710/38 |
| 5,682,513 A | 10/1997 | Candelaria et al. ......... 711/113 |
| 5,815,649 A | 9/1998 | Utter et al. ..................... 714/6 |
| 5,832,222 A | 11/1998 | Dziadosz et al. ........... 709/216 |
| 5,845,328 A | 12/1998 | Maya et al. ................ 711/162 |
| 5,870,537 A | 2/1999 | Kern et al. ..................... 714/6 |
| 5,889,935 A | 3/1999 | Ofek et al. ..................... 714/6 |
| 5,901,327 A | 5/1999 | Ofek .......................... 711/100 |
| 5,920,695 A | 7/1999 | Hathorn et al. ......... 395/200.38 |
| 5,933,653 A | 8/1999 | Ofek .......................... 395/826 |
| 5,960,216 A | 9/1999 | Vishlitzky et al. ............ 710/74 |
| 6,141,731 A | * 10/2000 | Beardsley et al. .......... 711/136 |
| 6,282,610 B1 | * 8/2001 | Bergsten ..................... 711/114 |
| 6,304,980 B1 | * 10/2001 | Beardsley et al. ............. 714/6 |

FOREIGN PATENT DOCUMENTS

JP          10031561          2/1998

OTHER PUBLICATIONS

"Method for Improving the Host I/O Performance during Concurrent Copy", IBM Technical Disclosure Bulletin, vol. 37, No. 02A, Feb. 1994, pp. 481–482.

(List continued on next page.)

Primary Examiner—Charles Rones
(74) Attorney, Agent, or Firm—David W. Victor; Konrad Raynes Victor & Mann LLP (57) ABSTRACT

Disclosed is a method, system, program, and data structure for providing a shadow copy of data storage areas in a primary site to data storage areas in a secondary site. A definition is made of storage areas in the primary site having data to be shadowed and corresponding storage areas in the secondary site to shadow data at the storage areas in the primary site. A shadow pair comprises one primary storage area and one secondary storage area that shadows data for the primary storage area in the pair. A standard data transfer interface protocol command, such as a SCSI or Fibre Channel command, is used to configure status storage areas in the secondary site to provide status information and data for each primary and secondary storage area. A write command in the standard data transfer interface protocol is then used to write status information to the status storage areas indicating status of the shadowed data at the secondary storage areas in the pairs.

27 Claims, 5 Drawing Sheets

OTHER PUBLICATIONS

"Remote Copy Link–Level Reconfiguration without Affecting Copy Pairs", IBM Technical Disclosure Bulletin, vol. 38, No. 01, Jan. 1995, pp. 305–306.

"Management of Peer–to–Peer Control Unit Paths", IBM Technical Disclosure Bulletin, vol. 38, No. 09, Sep. 1995, pp. 95–98.

"Performance Improvements through the use of Multi–Channel Command Word", IBM Technical Disclosure Bulletin, vol. 38, No. 09, Sep. 1995, pp. 155–156.

"Bad Response to Establish Pathing Control Frame in Peer–to–Peer Remote Copy Function", IBM Technical Disclosure Bulletin, vol. 38, No. 12, Dec. 1995, pp. 515–517.

"Efficient Management of Remote Disk Subsystem Data Duplexing", IBM Technical Disclosure Bulletin, vol. 39, No. 01, Jan. 1996, pp. 49–51.

"Fixed Storage Allocation of Input–Output Buffers", IBM Technical Disclosure Bulletin, vol. 39, No. 03, Mar. 1996, opp. 75–76.

"Integration of Persistent Memory Data Info Real–Time Asynchronous Direct Access Storage Device Remote Copy", IBM Technical Disclosure Bulletin, vol. 39, No. 10, Oct. 1996, pp. 187–189.

"Single Subsystem PPRC Copy", IBM Research Disclosure, Feb. 1999, p. 264.

* cited by examiner

METHOD, SYSTEM, AND PROGRAM FOR REMOTE COPY IN AN OPEN SYSTEMS ENVIRONMENT

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Selecting One of Multiple Paths to Communicate With a Device", to David A. Burton, Robert L. Morton, and Erez Webman, U.S. patent application Ser. No. 09/591,024, currently pending ,and "Method, System, And Program For Determining A Number of Write Operations to Execute" to David A. Burton, Robert L. Morton, and Erez Webman, U.S. patent application Ser. No. 09/591,023, currently pending.

BACKGROUND OF THE INVENTION

1. Field of the Invention

The present invention relates to a system, method, and program for shadowing data at a remote site and, in particular, shadowing data in an open systems environment.

2. Description of the Related Art

Data storage systems often include a data protection component that involves creating a back-up copy of data to use in the event of a system failure. One such data protection system involves the use of a computer at a remote site, often referred to as the secondary system, shadowing data storage at a primary site having a primary computer and storage. If there is a system failure at the primary site, then the data can be recovered from the secondary site. One such disaster recovery system that provides data shadowing is the International Business Machines Corporation (IBM) Peer-to-Peer Remote Copy (PPRC) system. In a PPRC system, a primary storage controller provides access to a primary mass storage systems, such as one or more Direct Access Storage Devices (DASDs), comprised of interconnected hard disk drives. The storage controller manages the flow of data from host systems to DASDs. A secondary controller provides a shadow copy of designated volumes in the primary DASD in a secondary mass storage system. A high speed dedicated line, such as Enterprise System Connection (ESCON) channels **, may be used to transfer data from the primary controller to the secondary controller. In PPRC systems, a relationship is established between volumes in the primary DASD and the secondary DASD by copying the designated volumes from the primary DASD to the secondary DASD through the primary and secondary controllers. After the establishment phase, any updates to the protected volumes in the primary DASD are copied over to the secondary controller and DASD to synchronize the data therebetween.

**Enterprise Storage Server and ESCON are registered trademarks and Fibre Channel Raid Storage Controller is a trademark of IBM; Windows and Windows NT are registered trademarks of Microsoft Corporation.

Current data shadowing systems require that both the primary and secondary control unit include special purpose data shadowing firmware or software to implement the data shadowing relationship between a primary and secondary controllers, such as the IBM PPRC and XRC software and firmware. In such systems, typically, the controllers involved in shadowing customer data are from the same vendor.

Many computer networks operate in an open system environment and transfer data using the Small Computer System Interface (SCSI) or Fibre Channel architectures. In an open system environment, systems may be from different vendors and would not communicate using special, vendor specific protocols, such as PPRC or XRC. Thus, there is a need to provide data shadowing in an open systems environment where the systems do not include special purpose firmware or software to implement such data shadowing.

SUMMARY OF THE PREFERRED EMBODIMENTS

To overcome the limitations in the prior art described above, preferred embodiments disclose a method, system, and program for providing a shadow copy of data storage areas in a primary site to data storage areas in a secondary site. A definition is made of storage areas in the primary site having data to be shadowed and corresponding storage areas in the secondary site to shadow data at the storage areas in the primary site. A shadow pair comprises one primary storage area and one secondary storage area that shadows data for the primary storage area in the pair. A standard data transfer interface protocol command, such as a SCSI or Fibre Channel command, is used to configure status storage areas in the secondary site to provide status information and data for each primary and secondary storage area. A write command in the standard data transfer interface protocol is then used to write status information to the status storage areas indicating status of the shadowed data at the secondary storage areas in the pairs.

In further embodiments, an update from a host to one storage area in the primary site in one shadow pair to update is received. The write command in the standard data transfer interface protocol is then used to write the update to the storage area for the pair to update.

Preferred embodiments provide a methodology for allowing a remote controller in an open systems environment to function as a secondary site to shadow data at a primary site. Preferred embodiments allow the primary controller to use a standard data transfer interface protocol, such as SCSI or Fibre Channel Protocol (FCP), to place status information and data at the secondary site on the state of data being shadowed. In the event of a failure at the primary site, another system can use the status information to determine the consistency of the data at the secondary site in shadowing the data at the primary site. With the preferred embodiments, the secondary controller does not include special purpose data shadowing because the primary controller uses standard data transfer protocols to maintain data shadowing status at the secondary site.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
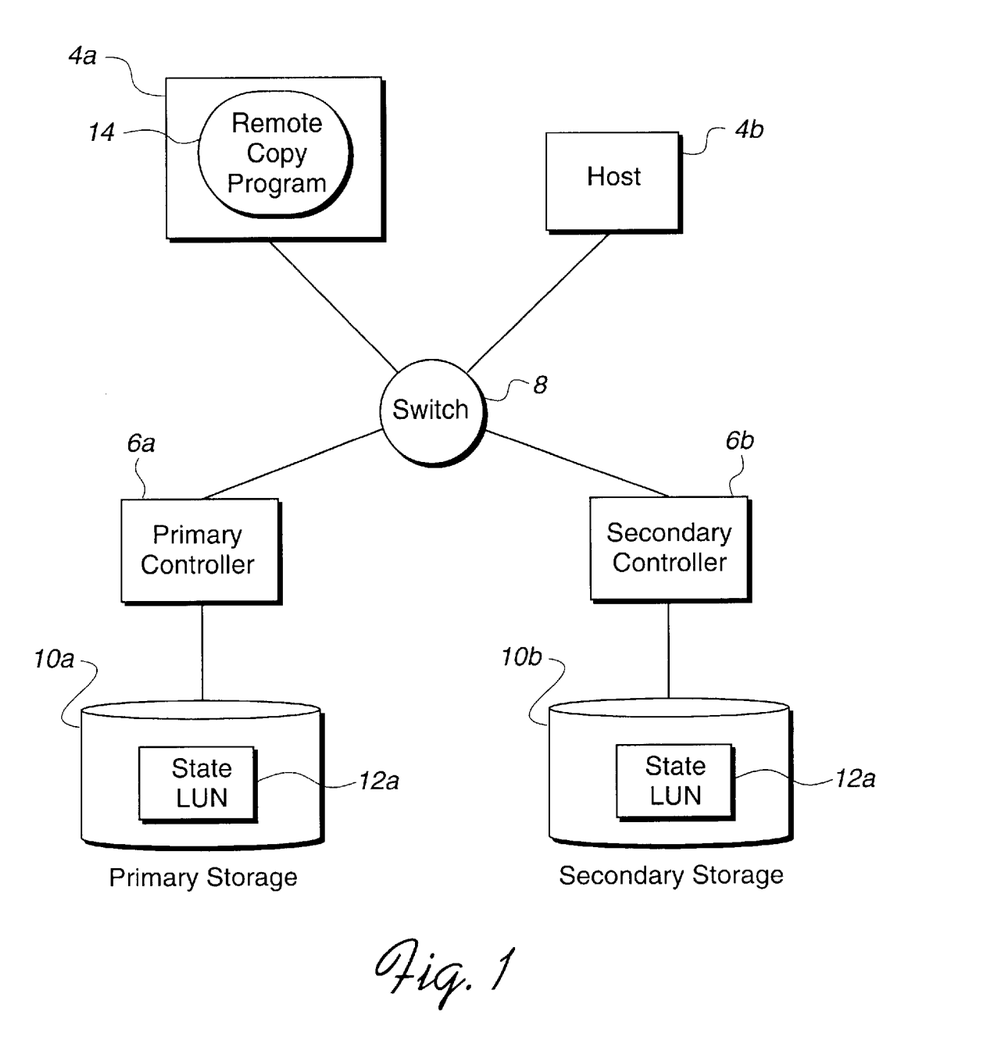
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include at least one adaptor, such as a Fibre Channel or Small Computer System Interface (SCSI) adaptor card or any other network adaptor card known in the art. The host adaptors allow the hosts 4a, b to communicate with storage controllers 6a, b via switch 8. The switch 8 may comprise the IBM Fibre Channel Storage Hub or Switch, the IBM SAN Fibre Channel Switch, or any other switching device known in the art. A primary site includes a primary controller 6a and primary storage 10a. Designated volumes in the primary storage 10 are transferred to a secondary site comprising a secondary controller 6b and secondary storage 10b. The storage devices 10a, b may comprise a DASD or any other non-volatile storage device and system known in the art.

Preferred embodiments are implemented in an open systems environment where the primary and secondary controllers 6a, b and hosts 4a, b may comprise different types of systems from different vendors that communicate using a common protocol such as SCSI or Fibre Channel Protocol (FCP). Thus, the hosts 4a, b and controllers 6a, b may include any operating system known in the art, including the Microsoft Corporation Windows and NT operating systems or any other specialized operating system.** In such open systems environment, the primary controller 6a can use commonly used write commands, such as SCSI write commands, to copy the primary volumes to the secondary volumes in the secondary storage 10b. In such open system embodiments, the secondary controller 6b does not need special purpose software to coordinate the shadowing activities with the primary controller 6b as the primary controller 6a accomplishes the shadowing by using standard interface protocol write commands. In such open systems, the primary and secondary controllers 6a, b may comprise any controller device known in the art and the primary and secondary controllers 6a, b may be of different models and model types, and even of different classes of storage controllers.

**Enterprise Storage Server and ESCON are registered trademarks and Fibre Channel Raid Storage Controller is a trademark of IBM; Windows and Windows NT are registered trademarks of Microsoft Corporation.

To ensure data consistency, both the primary 6a secondary 6b controllers maintain a state LUN 12a, b indicating their view of the state of shadowing data between the primary and secondary 6a, b controllers. In the event of a failure of the primary controller 6a, the hosts 4a, b can query the state LUN 12b at the secondary controller 6b to determine the consistency of the data being shadowed between the primary and secondary controllers 6a, b. In preferred embodiments, state information is maintained for each LUN pair being shadowed between the primary 10a and secondary 10b DASDs, to allow data consistency to be determined on a LUN by LUN basis. The state LUNs 12a, b are created during the establishment phase. Below are four possible states that may be indicated in the state LUNs 12a, b:

Simplex: This is the state before the establishment of a remote copy relationship between LUNs and after the remote copy session has terminated. Simplex means that the LUN is not currently involved in data shadowing. Ending a remote copy relationship between the primary and secondary LUNs returns the two devices to the simplex state.

Duplex Pending: The state during the establishment phase where data is initially being copied from the primary LUN to the secondary LUN, but has not yet completed. At this point, data is not consistent between the primary and secondary LUNs, and the remote copy at the particular secondary LUN cannot be used. The establishment phase ends when all the data in the primary LUN has initially been copied over.

Full Duplex: The primary and secondary LUN pair are consistent except for current writes to the primary LUN received at the primary controller 6a.

Suspend Duplex: Changes to the primary LUN have not been communicated to the secondary LUN. The suspend state occurs when only one of the devices in a dual copy or remote copy LUN pair is being updated because of either a permanent error condition or an authorized user command. All writes to the remaining functional device are logged. This allows for automatic resynchronization of both LUNs when the LUN pair is reset to the duplex state. If suspend duplex is the state during the establishment phase where data is copied for the first time between the primary and secondary LUNs in the DASDs 10a, b, then the data is not consistent as the initial copy has not completed. However, if suspend duplex is the state after the initial establishment copy has completed, then the data at the secondary LUN is consistent, but not up-to-date, as recent writes were not communicated to the secondary LUN.

In preferred embodiments one or more hosts, e.g., host 4a for purposes of this discussion, would include a remote copy program 14 (shown in FIG. 1) that allows the host 4a to participate in remote copy operations as a remote copy host. The remote copy host 4a would execute the remote copy program 14 to query the secondary state LUN 12b in the event of a failure to determine the extent to which shadowed data at the secondary LUNs may be used to recover the failed primary LUNs. In preferred embodiments, the secondary state LUN 12b is configured in a redundant array of independent disks (RAID) to ensure that the state information is not lost in the event of a single drive failure in the secondary DASD 10b.

Figure 2:
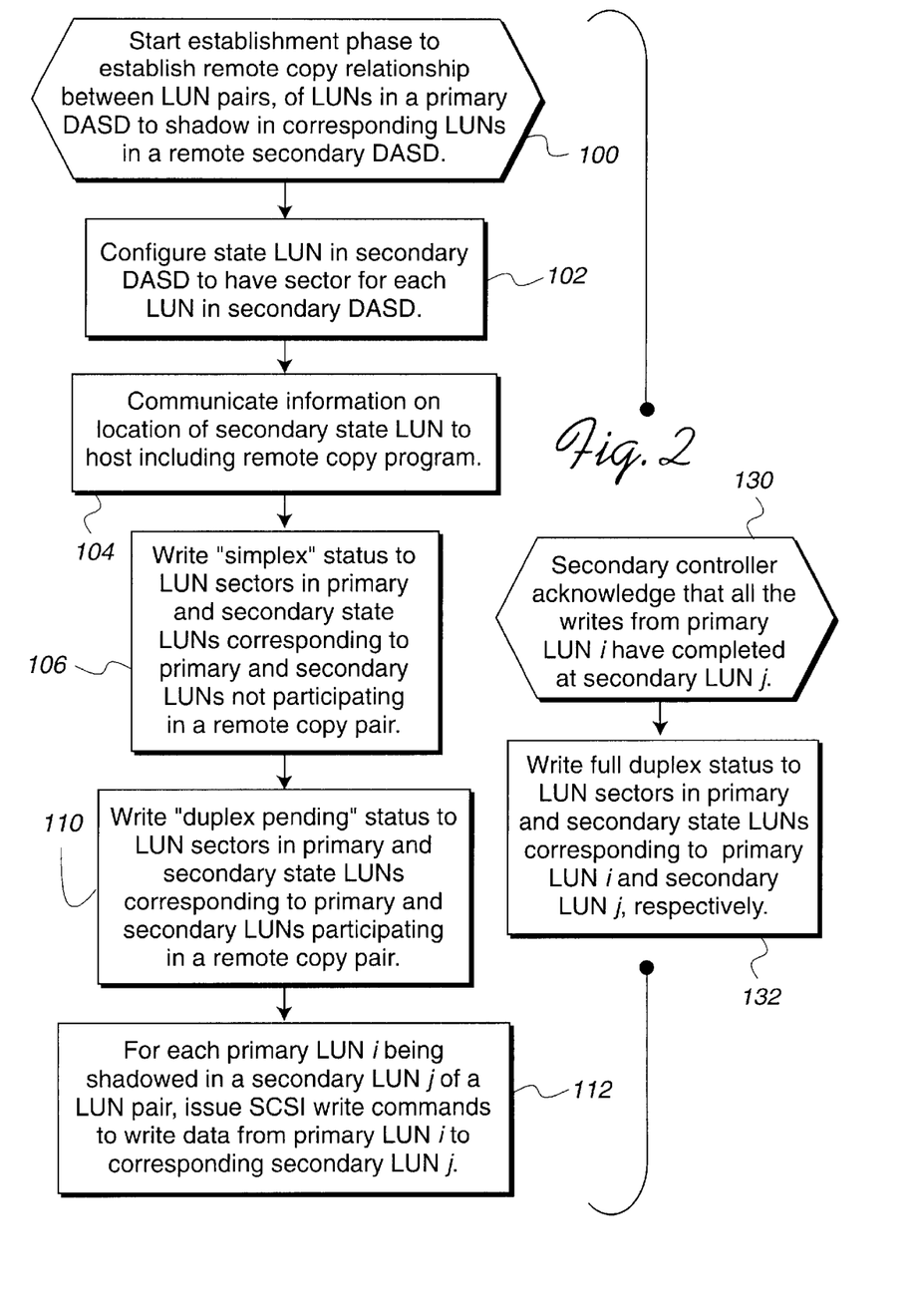
FIGS. 2–5 illustrate logic implemented in a primary controller and remote copy host to implement the data shadowing in accordance with preferred embodiments of the present invention.

FIG. 2 illustrates logic implemented in software and/or firmware of the primary controller 6a to establish a relationship between primary LUNs in the primary DASD 10a and second LUNs in the secondary DASD 10b to provide a remote copy or data shadowing for the primary LUNs involved in the relationship. As discussed, before the secondary site can start shadowing updates to the primary site, a relationship of primary LUNs in the primary DASD 10a and secondary LUNS in the secondary DASD 10b must be established. Control begins at block 100 with the primary controller 6a initiating the establishment phase between LUN pairs, LUNs to be shadowed in the primary DASD 10a and the corresponding secondary LUN in the pair that will shadow the data. At block 102, the primary controller 6a configures a state LUN 12b in the secondary DASD 10b to include a sector for each LUN in the secondary DASD 10b. In preferred embodiments, the primary controller 6a uses the vendor specific configuration commands for the secondary controller 6b to configure the state LUN 12b in the secondary DASD 10b. In preferred embodiments, the primary controller 6a would send these vendor-specific configuration commands through the Fibre Channel device driver. The primary controller 6a would further configure a primary state LUN 12a that also maintains a copy of the status.

The primary controller 6a then communicates (at block 104) the location information of the secondary state LUN 12b in the secondary DASD 10b to the remote copy host 4a. The remote copy host 4a would use such information to access the remote copy status at the secondary site in the event of a failure of the primary DASD 10a. The primary controller 6a will issue (at block 106) write commands to write "simplex" status to the LUN sectors in the primary and secondary state LUNs 12a, b corresponding to primary and secondary LUNs, respectively, not participating in remote copy LUN pairs, i.e., not involved in data shadowing operations. The primary controller 6a will further issue (at block 110) write commands to write "duplex pending" status to the sectors in the primary and secondary state LUNs 12a, b corresponding to primary and secondary LUNs, respectively, participating in remote copy LUN pairs.

For each remote copy LUN pair of a primary LUN i being shadowed by a secondary LUN j, the primary controller 6a will issue (at block 112) write commands to write the customer data from the primary LUN i to the secondary LUN j. The primary controller 6a may utilize the algorithm described in the co-pending application "Method, System, and Program for Determining a Number of Write Operations to Execute," having attorney docket No. TUC9-2000-0015US1, which application is incorporated herein by reference in its entirety, to manage writes to copy the data from the primary LUN i to secondary LUN j. Upon receiving (at block 130) acknowledgment from the secondary controller 6b that the write operations to LUN j completed at the secondary DASD 10b, the primary controller 6a will write (at block 132) "full duplex status" to the LUN i sector in the primary state LUN 12a and to the LUN j sector in the secondary state LUN 12b. At this point, the establishment phase has completed and all the data from the LUNs in the primary DASD 10a involved in remote copy has successfully been copied over to the LUNs in the secondary DASD 10b shadowing the data in the primary LUNs.

Figure 3:
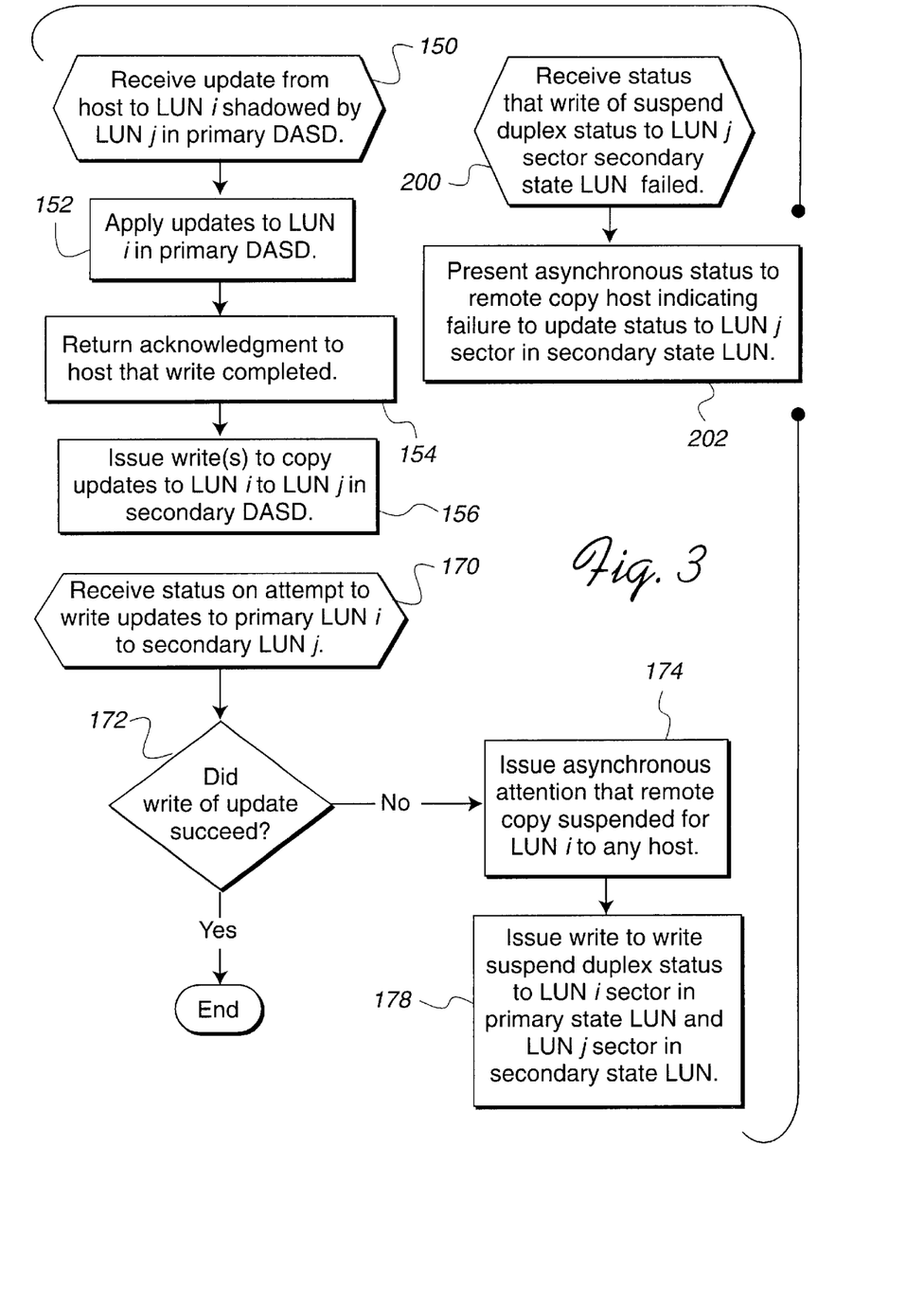

FIG. 3 illustrates logic implemented in firmware and/or software in the primary controller 6a to shadow updates to LUNs in the primary DASD 10a that are part of a remote copy LUN pair, i.e., being shadowed on the secondary DASD 10b. Control begins at block 150 with the primary controller 6a receiving an update to LUN i in the primary DASD 10a that is part of a remote copy LUN pair, being shadowed by LUN j in the secondary DASD 10b. The LUNs i and j may be the same LUN number or different LUN numbers. The primary controller 6a applies (at block 152) the updates to LUN i in the primary DASD 10a and returns acknowledgment (at block 154) to the host initiating the write that the update is completed. The primary controller 6a then issues (at block 156) one or more writes, such as SCSI write commands, to copy the updates to LUN i to LUN j in the secondary DASD 10b.

At block 170, the primary controller 6a receives status on the write request to secondary LUN j of the updates to the primary LUN i. If (at block 172) the status indicates that the updates were not successfully written to the secondary LUN j or the write otherwise failed for any reason, including problems with the connection, then the primary controller 6a issues (at block 174) an asynchronous attention status, such as a SCSI Unit Attention, that remote copy is suspended for LUN i. This informs; the host 4a, b that initiated the write operation and all other hosts that they cannot obtain current data for LUN i from the secondary DASD 10b. This status is only issued once. The primary controller then issues (at block 178) a write command to write "suspend duplex" status to the LUN i and LUN j sectors in the primary 12a and secondary 12b state LUNs, respectively. At this point, the hosts 4a, b can still write updates to LUN i. However, the asynchronous attention informs the hosts 4a, b that they cannot rely on the secondary DASD 10b to provide current data. Otherwise, if the updates were successfully written to secondary LUN j, then the logic ends.

If, at block 200, the primary controller 6a receives status that the write of the "suspend duplex" status to the LUN j sector in the secondary state LUN 12b failed, then the primary controller 6a presents (at block 202) asynchronous status to the remote copy host 4b and any other host attempting to access LUN i of a failure to update status to the LUN j sector in the secondary state LUN 12b. This informs the hosts 4a, b that they cannot rely on the status information for LUN i maintained in the secondary state LUN 12b. This asynchronous status may be implemented in a read command the remote copy host 4a presents to the primary controller 6a. The primary controller 6a may queue this read request and leave it outstanding until it needs to present status to the remote copy host 4a on a failed attempt to write "suspend duplex" status to the secondary site. The asynchronous status indicating the failure to update LUN j sector at the secondary site is only presented once to each host. Thus, the host 4a, b receiving the asynchronous status continues to believe the secondary state LUN 12b does not reflect the correct status for LUN j until it receives a subsequent status indicating otherwise.

Figure 4:
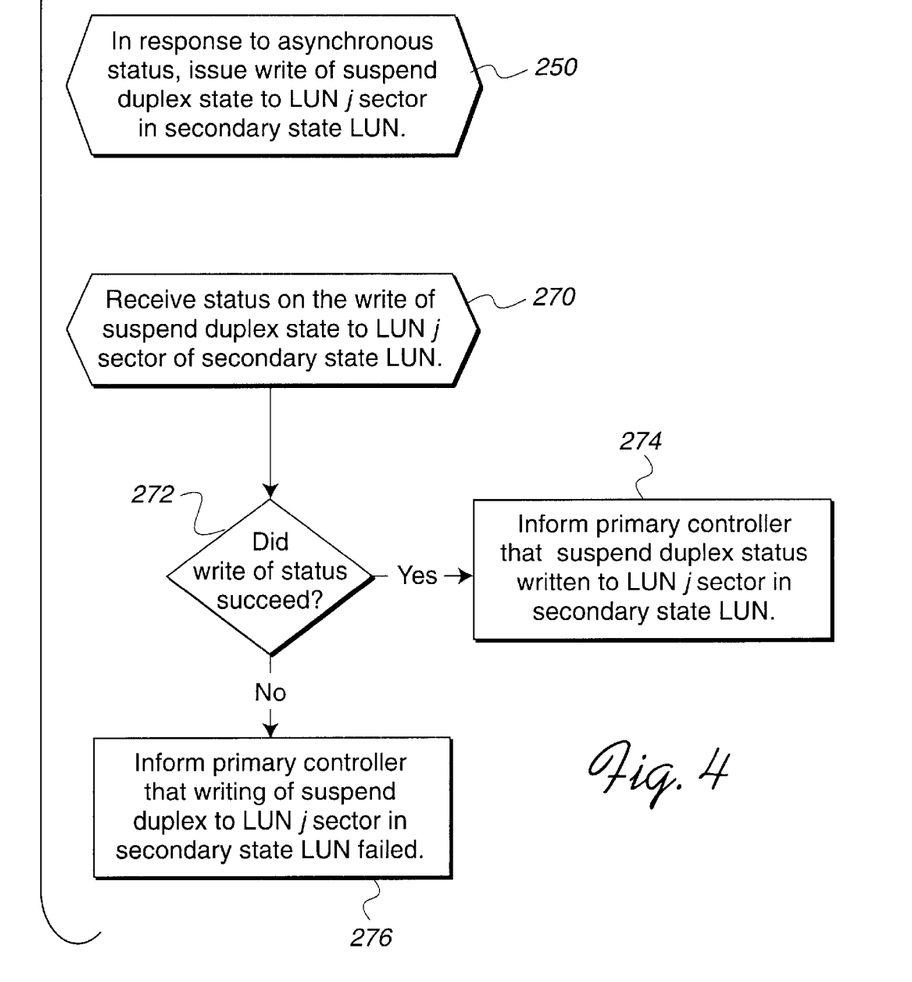

FIG. 4 illustrates logic implemented in the remote copy program 14 to involve the remote copy host 4b in the remote copy operations and assist the primary controller 14a with remote copy. If the primary controller 6a could not write the "suspend duplex" status to the LUN j sector in the secondary state LUN 12b, then the remote copy host 4a may try to apply the "suspend duplex" status as it may have alternative communication paths to the secondary DASD 10b not available to the primary controller 10a. At block 250, in response to receiving the asynchronous status from the primary controller 4a (at block 202, FIG. 3), the remote copy host 4a would issue a write to write the "suspend duplex" state to the LUN j sector in the secondary state LUN 12b. At block 270, the remote copy host 4a receives status on the write "suspend duplex" to the secondary state LUN 12b. If the status (at block 272) indicates that the write succeeded, then the remote copy host 4a informs (at block 274) the primary controller 4a of the successful write of the status; otherwise, the primary controller 4a is notified (at block 276) that the write of the "suspend duplex" status failed.

Figure 5:
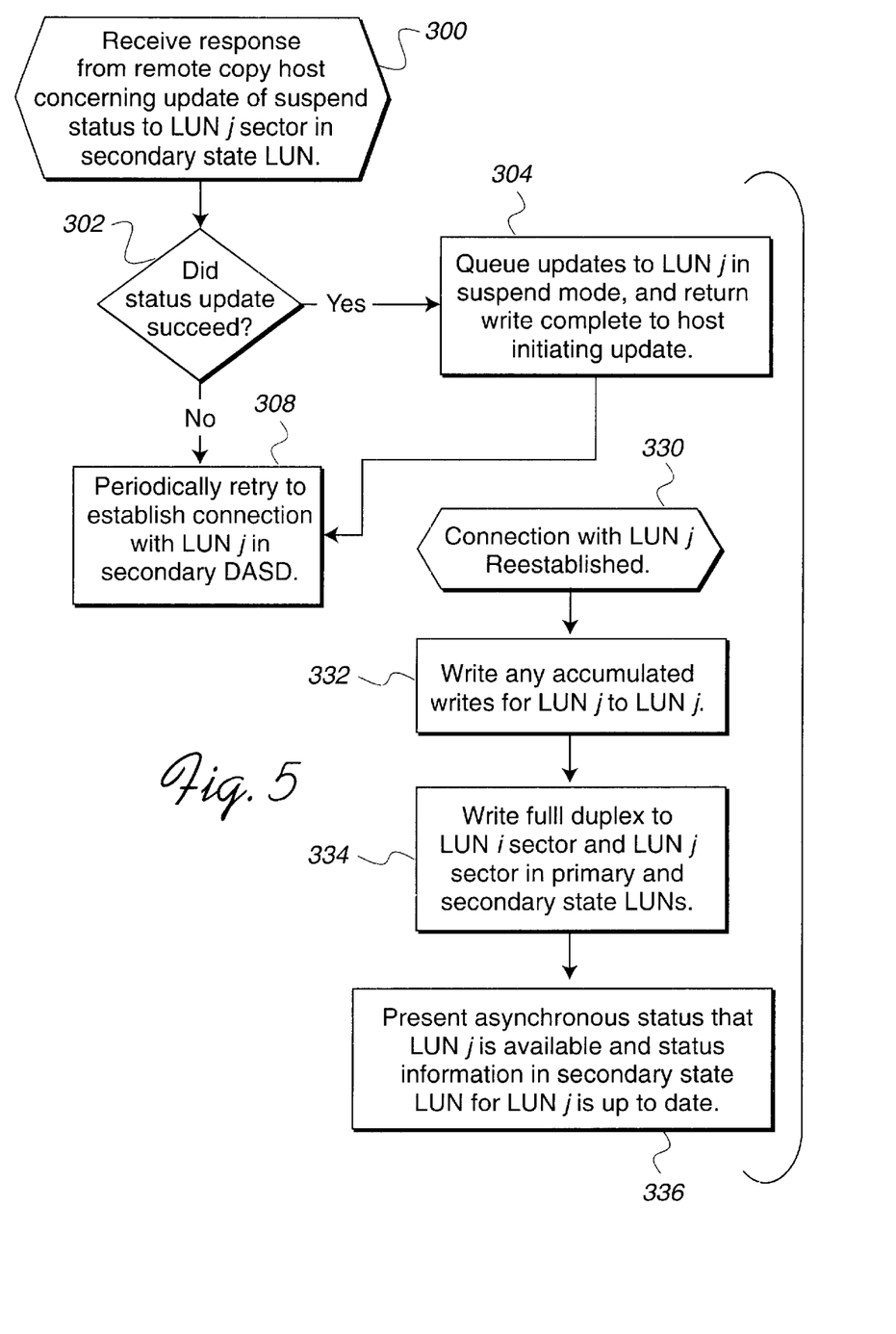

FIG. 5 illustrates logic implemented as software and/or firmware in the primary controller 6a. Control begins at block 300 with the primary controller 6a receiving a response from the remote copy host 4b concerning the write of the "suspend duplex" status to the LUN j sector in the secondary state LUN 12b. If the status was successfully updated (at block 302), then the primary controller 4a queues (at block 304) the updates to LUN j. The primary controller 6a would return success to the host 4a, b initiating the update. From the no branch of block 302 or 304, control transfers to block 308 where the primary controller 6a would periodically attempt to establish a connection with LUN j in the secondary DASD 10b.

As discussed, there are two possible asynchronous statuses. One indicates that the secondary DASD 10b does not include current data for LUN i and the second indicates that the status for LUN i in the secondary state LUN 12b is not accurate. At block 330, the primary controller 6a receives notification that the connection with LUN j at the secondary site is reestablished. The primary controller 6a then writes (at block 332) any queued writes for LUN j to LUN j and then writes (at block 334) "full duplex" status to the LUN i and LUN j sectors in the primary 12a and secondary 12b state LUNs, respectively. The primary controller 12a further provides (at block 336) asynchronous status one time to any host providing updates to LUN j of the new status of LUN j, i.e., that it is available and the status for LUN j in the secondary state LUN 12b is current.

With the preferred embodiments, in the event of a failure in the primary DASD 10a, the remote copy host can read the secondary state LUN 12b to determine the status of the secondary LUNs shadowing data. If the status is full duplex, then the remote copy host 4a knows that the data at the secondary LUNs in the remote copy LUN pairs is consistent for all writes that have completed. In preferred embodiments, hosts log updates in a journal until they receives status that the update was successfully applied. In the event of a failure, for those writes that have not completed, the hosts 4a, b can recover the unapplied writes from the host journal log, and then apply those updates to the secondary LUNs involved in remote copy to derive the current data at the time of the failure. If multiple hosts had outstanding writes to the primary LUNs in the remote copy relationship, then the uncompleted updates would have to be gathered from journal logs from all those hosts having uncompleted updates to the primary LUNs.

If there is a failure, and the status is "duplex pending", then the data at the secondary LUN is not consistent because the establishment phase of the initial copy has not completed to that particular LUN. "Suspend duplex" means that updates have not been communicated to the secondary LUN due to a failure. In case of a failure while the secondary LUN is in "suspend duplex", the data can be recovered from the journal logs of hosts that have outstanding updates to the primary LUNs involved in the remote copy operation.

Preferred embodiments provide a system for allowing controllers in an open systems environment to function as secondary controllers in a remote copy relationship to shadow data. In the preferred embodiments, the secondary controllers do not need any special purpose firmware or software to participate in the data shadowing relationship. Instead, the primary controller writes status information to the secondary DASD using a standard data transfer interface protocol, such as SCSI or Fibre Channel commands, that are acceptable by all systems in an open system environment. The status information is written to the secondary DASD to allow a remote copy host or agent to determine the status of remote copy operations at the time of the failure of the primary DASD.

Conclusion

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, programmable logic, memory devices (e.g., EEPROMs, ROMs, PROMs, RAMs, SRAMs, etc.) carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

In preferred embodiments, one primary controller 6a shadowed data on a single secondary controller 6b. However, in alternative arrangements, one primary controller may shadow data at multiple secondary controllers or multiple primary controllers may shadow data at one or more secondary controllers.

In preferred embodiments, data storage areas were delineated as LUNs. In alternative embodiments, storage areas may be divided according to different means.

The preferred logic of FIGS. 2–5 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In preferred embodiments, the primary and secondary controllers communicated over a fibre channel interface using SCSI or Fibre Channel commands. In alternative embodiments, different command protocols may be utilized. For instance, the ESCON protocol may be used for the channel communications and the count-key-data.(CKD) protocol may be used for the input/output (I/O) commands.

Preferred embodiments were described with respect to a storage system in which data from a primary site is shadowed at a secondary site as part of a data backup and recovery system. However, the preferred method, system, and program for shadowing data may apply to non-data recovery systems, or whenever a mirror copy of data is needed.

In summary, preferred embodiments disclose a method, system, and program for providing a shadow copy of data storage areas in a primary site to data storage areas in a secondary site. A definition is made of storage areas in the primary site having data to be shadowed and corresponding storage areas in the secondary site to shadow data at the storage areas in the primary site. A shadow pair comprises one primary storage area and one secondary storage area that shadows data for the primary storage area in the pair. A standard data transfer interface protocol command, such as a SCSI or Fibre Channel command, is used to configure status storage areas in the secondary site to provide status information and data for each primary and secondary storage area. A write command in the standard data transfer interface protocol is then used to write status information to the status storage areas indicating status of the shadowed data at the secondary storage areas in the pairs.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a shadow copy of data storage areas in a primary site to data storage areas in a secondary site, comprising:

defining storage areas in the primary site having data to be shadowed and corresponding storage areas in the secondary site to shadow data at the storage areas in the primary site, wherein a shadow pair comprises one primary storage area and one secondary storage area that shadows data for the primary storage area in the pair;

using a standard data transfer interface protocol command to configure status storage areas in the secondary site to provide status information and data for each primary and secondary storage area; and using a write command in the standard data transfer interface protocol to write status information to the status storage areas indicating status of the shadowed data at the secondary storage areas in the pairs.

2. The method of claim 1, further comprising using the write command in the standard data transfer interface protocol to write a status to each status storage area providing status information for storage areas at the primary and secondary sites not involved in data shadow operations.

3. The method of claim 1, further comprising:

using the write command in the standard data transfer interface protocol to write a first status to each status storage area for a primary and secondary storage area pair involved in data shadow operations; and using the write command in the standard data transfer interface protocol to write a second status to status storage areas for those primary and secondary pairs where data was successfully copied from the storage area in the primary site to the storage area in the secondary site.

4. The method of claim 1, further comprising:

receiving an update from a host to one storage area in the primary site in one shadow pair to update; and using the write command in the standard data transfer interface protocol to write the update to the secondary storage area for the pair to update.

5. The method of claim 4, further comprising:

if the write of the update to the secondary storage area in the pair to update did not complete, then using the write command in the standard data transfer interface protocol to write a suspend status to the status storage area for the pair to update;

applying the update to the storage area in the primary site in the pair if the suspend status was written to the status storage area for the pair to update.

6. The method of claim 5, further comprising:

if the write of the suspend status failed to the status storage area, then notifying a remote computer;

using, with the remote computer, the write command in the standard data transfer interface protocol to write the suspend status to the status storage area for the pair to update.

7. The method of claim 6, further comprising:

presenting asynchronous status if the suspend status or data was not written to the secondary site.

8. The method of claim 7, further comprising:

queuing updates that were not written to the storage area at the secondary site;

retrying to write the queued updates to the secondary site; and presenting further the asynchronous status after successfully writing the queued updates to the storage area at the secondary site indicating that data at the secondary site is current.

9. The method of claim 1, wherein the standard data transfer interface protocol comprises SCSI or Fibre Channel Protocol.

10. A system for shadowing data:

a primary site including a primary controller and primary storage;

a secondary site including a secondary controller and secondary storage;

means for defining storage areas in the primary site having data to be shadowed and corresponding storage areas in the secondary site to shadow data at the storage areas in the primary site, wherein a shadow pair comprises one primary storage area and one secondary storage area that shadows data for the primary storage area in the pair;

means for using a standard data transfer interface protocol command to configure status storage areas in the secondary site to provide status information and data for each primary and secondary storage area; and means for using a write command in the standard data transfer interface protocol to write status information to the status storage areas indicating status of the shadowed data at the secondary storage areas in the pairs.

11. The system of claim 10, further comprising means for using the write command in the standard data transfer interface protocol to write a status to each status storage area providing status information for storage areas at the primary and secondary sites not involved in data shadow operations.

12. The system of claim 10, further comprising:

means for using the write command in the standard data transfer interface protocol to write a first status to each status storage area for a primary and secondary storage area pair involved in data shadow operations; and means for using the write command in the standard data transfer interface protocol to write a second status to status storage areas for those primary and secondary pairs where data was successfully copied from the storage area in the primary site to the storage area in the secondary site.

13. The system of claim 10, further comprising:

means for receiving an update from a host to one storage area in the primary site in one shadow pair to update; and means for using the write command in the standard data transfer interface protocol to write the update to the secondary storage area for the pair to update.

14. The system of claim 13, further comprising:

means for using the write command in the standard data transfer interface protocol to write a suspend status to the status storage area for the pair to update if the write of the update to the secondary storage area in the pair to update did not complete;

means for applying the update to the storage area in the primary site in the pair if the suspend status was written to the status storage area for the pair to update.

15. The system of claim 14, further comprising:

a remote computer;

means for notifying the remote computer if the write of the suspend status failed to the status storage area;

means, in the remote computer, for using the write command in the standard data transfer interface protocol to write the suspend status to the status storage area for the pair to update.

16. The system of claim 15, further comprising:

means for presenting asynchronous status if the suspend status or data was not written to the secondary site.

17. The system of claim 16, further comprising:

means for queuing updates that were not written to the storage area at the secondary site;

means for retrying to write the queued updates to the secondary site; and means for presenting further the asynchronous status after successfully writing the queued updates to the storage area at the secondary site indicating that data at the secondary site is current.

18. The system of claim 10, wherein the standard data transfer interface protocol comprises SCSI or Fibre Channel Protocol.

19. An information bearing medium for providing a shadow copy of data storage areas in a primary site to data storage areas in a secondary site, the information bearing medium comprising code capable of causing a processor to perform:

defining storage areas in the primary site having data to be shadowed and corresponding storage areas in the secondary site to shadow data at the storage areas in the primary site, wherein a shadow pair comprises one primary storage area and one secondary storage area that shadows data for the primary storage area in the pair;

using a standard data transfer interface protocol command to configure status storage areas in the secondary site to provide status information and data for each primary and secondary storage area; and using a write command in the standard data transfer interface protocol to write status information to the status storage areas indicating status of the shadowed data at the secondary storage areas in the pairs.

20. The information bearing medium of claim 19, further causing the processor to perform using the write command in the standard data transfer interface protocol to write a status to each status storage area providing status information for storage areas at the primary and secondary sites not involved in data shadow operations.

21. The information bearing medium of claim 19, further causing the processor to perform:

using the write command in the standard data transfer interface protocol to write a first status to each status storage area for a primary and secondary storage area pair involved in data shadow operations; and using the write command in the standard data transfer interface protocol to write a second status to status storage areas for those primary and secondary pairs where data was successfully copied from the storage area in the primary site to the storage area in the secondary site.

22. The information bearing medium of claim 19, further causing the processor to perform:

receiving an update from a host to one storage area in the primary site in one shadow pair to update; and using the write command in the standard data transfer interface protocol to write the update to the secondary storage area for the pair to update.

23. The information bearing medium of claim 22, further causing the processor to perform:

if the write of the update to the secondary storage area in the pair to update did not complete, then using the write command in the standard data transfer interface protocol to write a suspend status to the status storage area for the pair to update;

applying the update to the storage area in the primary site in the pair if the suspend status was written to the status storage area for the pair to update.

24. The information bearing medium of claim 23, further causing the processor to perform:

if the write of the suspend status failed to the status storage area, then notifying a remote computer;

wherein the information bearing medium further includes code capable of causing the remote computer to perform using the write command in the standard data transfer interface protocol to write the suspend status to the status storage area for the pair to update.

25. The information bearing medium of claim 24, further causing the processor to perform:

presenting asynchronous status if the suspend status or data was not written to the secondary site.

26. The information bearing medium of claim 25, further causing the processor to perform:

queuing updates that were not written to the storage area at the secondary site;

retrying to write the queued updates to the secondary site; and presenting further the asynchronous status after successfully writing the queued updates to the storage area at the secondary site indicating that data at the secondary site is current.

27. The information bearing medium of claim 19, wherein the standard data transfer interface protocol comprises SCSI or Fibre Channel Protocol.

* * * * *